(12) United States Patent
Handley et al.

(10) Patent No.: US 11,711,400 B2
(45) Date of Patent: Jul. 25, 2023

(54) ELECTRONIC ACCESS CONTROL SYSTEM

(71) Applicant: Home Depot Product Authority, LLC, Atlanta, GA (US)

(72) Inventors: John Handley, Atlanta, GA (US); Tushar Pujara, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 185 days.

(21) Appl. No.: 17/150,112

(22) Filed: Jan. 15, 2021

(65) Prior Publication Data

US 2022/0232044 A1 Jul. 21, 2022

(51) Int. Cl.
*H04L 9/40* (2022.01)
*G06F 21/60* (2013.01)
*G06F 21/00* (2013.01)

(52) U.S. Cl.
CPC .......... *H04L 63/205* (2013.01); *G06F 21/604* (2013.01); *H04L 63/0876* (2013.01); *H04L 63/101* (2013.01)

(58) Field of Classification Search
CPC ...... G06F 21/604; G06F 21/62; G06F 21/629; G06F 21/6281; H04L 63/10; H04L 63/107; H04L 63/108
See application file for complete search history.

(56) References Cited

U.S. PATENT DOCUMENTS

| | | | |
|---|---|---|---|
| 6,868,413 B1 | 3/2005 | Grindrond et al. | |
| 7,010,586 B1 | 3/2006 | Allavarpu et al. | |
| 7,484,237 B2 | 1/2009 | Joly et al. | |
| 8,245,281 B2 | 8/2012 | Cheeniyil et al. | |
| 8,918,834 B1 | 12/2014 | Samuelsson | |
| 8,955,148 B1 * | 2/2015 | Biegala | H04L 63/10 726/27 |
| 9,185,526 B2 | 11/2015 | Guba et al. | |
| 9,264,449 B1 | 2/2016 | Roth et al. | |
| 9,396,343 B2 | 7/2016 | Factor et al. | |
| 9,450,955 B2 | 9/2016 | Jagtap et al. | |
| 9,589,242 B2 | 3/2017 | Robinson et al. | |
| 9,894,101 B2 | 2/2018 | Hendrick et al. | |

(Continued)

OTHER PUBLICATIONS

Memildin et al., Using custom security policies, https://docs.microsoft.com/en-us/azure/security-center/custom-security-policies, Sep. 24, 2020, 8 pgs.

(Continued)

*Primary Examiner* — Edward Zee
(74) *Attorney, Agent, or Firm* — Greenberg Traurig, LLP

(57) ABSTRACT

Systems and methods for providing controlled access to a system by a user device include receiving, from a user device, a request including a current context. The method includes receiving a request for access to a computing resource, the request including a current context, the current context defining a user space and a resource space. The user device evaluates the current context against a security policy. The user device determines that the user device is permitted to access the computing resource based on the request in response to the evaluating the current context against the security policy. In response to determining that the user device is permitted to access the computing resource, accessing the computing resource as requested.

17 Claims, 4 Drawing Sheets

(56) References Cited

U.S. PATENT DOCUMENTS

| | | |
|---|---|---|
| 10,110,635 B1 | 10/2018 | Hussain et al. |
| 10,257,184 B1 | 4/2019 | Mehta et al. |
| 10,320,624 B1 | 6/2019 | Roth et al. |
| 10,579,821 B2 | 3/2020 | Larson et al. |
| 2009/0077621 A1 | 3/2009 | Lang et al. |
| 2014/0229595 A1 | 8/2014 | Burke et al. |
| 2014/0380405 A1* | 12/2014 | Forsberg ............... H04L 63/20 726/1 |
| 2015/0046971 A1 | 2/2015 | Huh et al. |
| 2016/0119379 A1 | 4/2016 | Nadkarni |
| 2016/0232370 A1 | 8/2016 | Rissanen et al. |
| 2017/0250915 A1 | 8/2017 | Long, III et al. |
| 2019/0098056 A1 | 3/2019 | Pitre et al. |

OTHER PUBLICATIONS

ISA/US, ISR and WO issued in Appl. No. PCT/US22/12402, dated Apr. 12, 2022, 11 pgs.

* cited by examiner

ELECTRONIC ACCESS CONTROL SYSTEM

FIELD OF THE DISCLOSURE

This disclosure is generally directed to access control for computer systems, including systems and methods for providing and managing access control to web-based services.

BACKGROUND

Deploying and managing electronic security policies can be a very complex task. In some cases, different users can have different access rights to various types of information, some of which can include merchant services and financial transactions. Typical models, such as a role-based attribute access model (RBAC), may rely upon a user's role (e.g., administrator, user) as a basis for access rights.

SUMMARY

Some embodiments include a computer-implemented method for providing controlled access to a system by a user device. The method includes receiving a request for access to a computing resource, the request including a current context, the current context defining a user space and a resource space. The user device evaluates the current context against a security policy. The user device determines that the user device is permitted to access the computing resource based on the request in response to the evaluating the current context against the security policy. In response to determining that the user device is permitted to access the computing resource, accessing the computing resource as requested.

In some embodiments, the security policy includes a merged security policy that includes a default security policy merged with at least one custom security policy.

In some embodiments, the merging is completed by a server device. In some embodiments, the merging is completed by an engine on the user device.

Some embodiments include a computer-implemented method for providing controlled access to a system by a user device. In response to receiving, by a server device, a request to access a computing resource made available by the server device and including a current context, the context defining a user space and a resource space, a default security policy is retrieved from a database and a custom security policy from the database. The default security policy as retrieved, and the custom security policy as retrieved are merged into a merged security policy. The server device evaluates the current context against the merged security policy. The server device determines that the request is permissible based on the evaluating the current context against the merged security policy. The server device enables access to the computing resource.

Some embodiments disclose a computer-implemented method that includes evaluating a current context against a security policy. The method further includes determining that a user device is permitted to access a computing resource based on the evaluating the current context against the security policy. The computing resource as requested is accessed.

BRIEF DESCRIPTION OF THE DRAWINGS

References are made to the accompanying drawings that form a part of this disclosure and illustrate embodiments in which the systems and methods described in this Specification can be practiced.

Like reference numbers represent the same or similar parts throughout.

DETAILED DESCRIPTION

Figure 1:
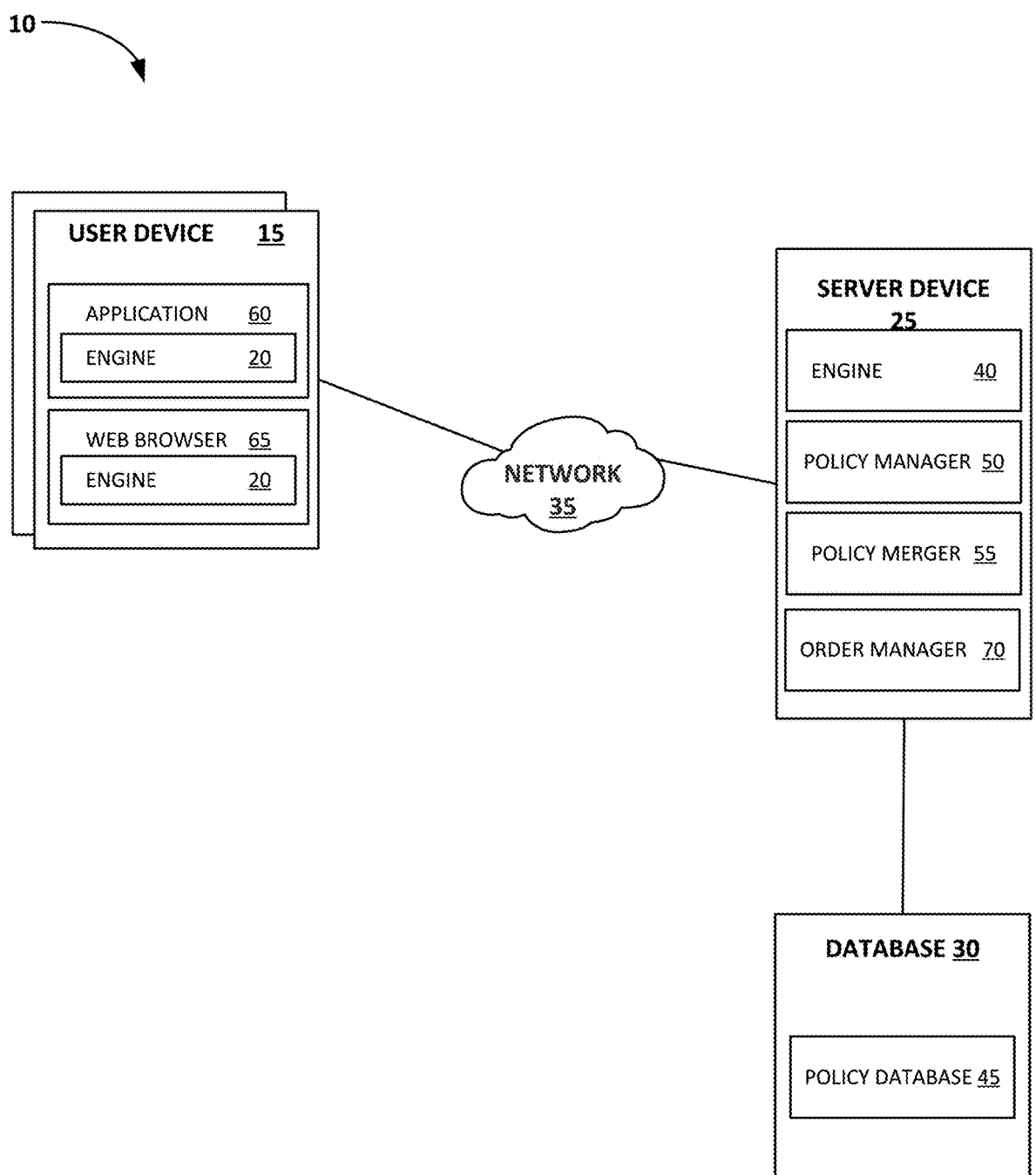
FIG. 1 is a diagrammatic view of an example access control system, according to some embodiments.

Business-to-business (B2B) interactions occur when a business makes a transaction (e.g., a commercial transaction) with another business. In some instances, for example if one of the businesses is a retailer, the transaction(s) can provide a transfer of goods. In B2B interactions, often times large businesses may utilize the computer systems of the selling business to control the transaction. As a result, there may be a large number of users (e.g., several hundred or more) of the computer systems of the seller. The various users can have different access rights to view and update the information within the seller's computer systems. Additionally, there may be a large number of businesses transacting with the seller. In such instances, the different businesses (and the users within the different businesses) may have different requirements for interacting with the seller's computer systems.

Typically, each user can be provided with a respective role in the system such as, but not limited to, an "administrator" or a "purchaser." However, these roles may include generalized rules that fit the security access appropriate for many or most users, but not all users. Additionally, there are generally limitations to how much each role is or can be customized. Further, the focus of the access controls is based on the user's role, without much consideration to the type of object upon which the user is operating. In such instances, it can be difficult for the seller to customize the user experience to match the needs of the numerous businesses and the numerous users of each of the businesses. Thus, improved methods for customizing the security policies, and accordingly, the user experiences, of the different businesses are desirable.

The above example is related to a number of businesses working within the computer systems of a seller. It is to be appreciated that the example is not exclusive to the relationship being with a seller. Instead, the disclosure herein may also be applied to seller businesses working within the computer systems of a buyer or purchaser. Furthermore, the teachings of the instant disclosure may be applicable for controlling access to an organization's data or computing resources by individuals or entities outside of the organization.

Embodiments of this disclosure are directed to an access control system that enables dynamic user experiences and customizable access controls to better capture a particular customer's requirements for a retail B2B system.

In some embodiments, the access control system can include an engine on one or more end user devices and an engine on a server that can enforce security policies that include a combination of a default and a custom security policy. The engine on the user device can parse the policies and implement the appropriate user experience, for example, by allowing or denying access based on the combined security policies. In some embodiments, the stored security policies can include a default security policy that is applied to all users of all businesses and one or more custom security policies unique to an individual business or a user within an individual business. The custom security policies include the differences relative to the default security policy. That is, the custom security policy does not include all policies within the default security policy. The custom security policy and the default security policy can be merged at runtime to provide the appropriate user experience based on the combination including the default security policy and the custom security policy.

FIG. 1 is a diagrammatic view of an example access control system 10, according to some embodiments. The system 10 can generally be used by a business to control access to various systems such as when conducting electronic interactions between the business and another business (e.g., business-to-business (B2B) interactions). As noted above, the system 10 could also be used by any organization for providing access to its data or computing resources by individuals or entities outside the organization.

The access control system 10 can be used to, for example, implement security policies for a plurality of customers and a plurality of users that can be customized to the needs of the particular customers and users. The access control system 10 can be used in place of a traditional role-based access control system (RBAC) which relies upon pre-defined roles that include specific privileges associated with the roles.

The access control system 10 can enable one or more users to define complex rules that can be customized for different users or businesses. The users defining the policies can be associated with the retailer, with the customer, or a combination thereof. This can enable access control that is flexible to different needs and modifications of users. Additionally, the users may be able to customize the security policies without engaging the retailer to institute the customizations.

In the illustrated embodiment, the system 10 includes a plurality of end user devices 15, a server device 25, and a database 30 that are electronically communicable with one other via a network 35.

The user devices 15 may include one or more respective computing systems used by one or more users can use to access one or more computer systems or resources made available by or through the server device 25, according to some embodiments.

Examples of suitable user devices 15 include, but are not limited to, a personal computer (PC), a laptop computer, a mobile device (e.g., a smartphone, a personal digital assistant (PDA), a tablet-style device, etc.), a wearable mobile device (e.g., a smart watch, a head wearable device, etc.), or the like. The user devices 15 generally include a display and an input. Examples of the displays for the user devices 15 include, but are not limited to, a monitor connected to a PC, a laptop screen, a mobile device screen, a tablet screen, a wearable mobile device screen, or the like. Examples of the inputs for the user devices 15 include, but are not limited to, a keyboard, a mouse, a trackball, a button, a voice command, a proximity sensor, a touch sensor, an ocular sensing device for determining an input based on eye movements (e.g., scrolling based on an eye movement), suitable combinations thereof, or the like. The user devices 15 can include aspects that are the same as, or similar to, FIG. 4 below.

The user devices 15 can, for example, be devices accessed by one or more businesses wanting to transact with a seller that controls the server device 25. For example, the user devices 15 can be users of various businesses that are purchasing one or more goods from a seller that controls the server device 25 (e.g., a B2B relationship). The user devices 15 can use, for example, an application 60 (e.g., installed on the user device) or a web browser 65 (installed on the user device) to access one or more computer systems or resources made accessible by the server device 25 to facilitate the transactions. For example, the server device 25 can include an order manager 70 configured to facilitate purchases by the customer from the retailer.

The user device 15 may store an engine 20 that may be applied or executed by the application or web browser. In the figure, the engine 20 is shown within the application 60 and within the web browser 65. In some embodiments, the engine 20 may function similar to, for example, a structured query language (SQL) engine to parse one or more security policies and evaluate the user's context against the security policies that are stored, for example, in policy database 45. The engine 20 is responsible for inspecting a request and generating an authorization determination, in some embodiments. In some embodiments, the engine 20 may generate an authorization request which is then sent to an engine 40 on the server device 25 for generating an authorization determination. The engine 20 can serve as both a policy enforcement point and a policy decision point. In some embodiments, the engine 20 can communicate with the engine 40 on the server device 25 via the network 35 to collectively evaluate a request relative to the policy list in the policy database 45.

A request from the user via one of the user devices 15 can include a context, an action, and a resource. In some embodiments, the context is a current "space" to be evaluated. In some embodiments, the current space can be a user space, a resource space, or the like. For example, a user space may be a query against a current state of the requester (e.g., what is the current role of the user?). A resource space may be a query against a resource (e.g., is the current purchase-order's creation date before Jan. 1, 2020?). For example, actions can include, but are not limited to, viewing a resource, adding a resource, editing a resource, deleting a resource, getting a resource, or the like. In some embodiments, the resource includes an object that an action can be performed upon. Examples of resources include, but are not limited to, a user, an order, a payment option, or the like.

Based on the request, the engine 20 can retrieve the security policies that are applicable for the user (e.g., from policy database 45). This includes retrieving the default security policy and any custom security policies for the user or the business the user is representing. If no custom security policy is identified, then the default security policy is retrieved and reviewed by the engine 20. If a custom security policy is identified, then the default security policy is merged with the custom security policy to determine the appropriate security policy. The engine 20 then enforces the security policy and allows or denies the action requested by the user. In some embodiments, the security policies can be stored as a policy list. In some embodiments, the policy list includes a list of policies that are associated together. In some embodiments, the policy list can include a list of policies stored in an array. A policy may be associated with another policy for a customer, a user, or a particular experience. That is, each customer can be associated with a respective policy list. In some embodiments, a security policy, or simply policy, includes an object that contains an action and a resource. Each policy may be representative of a singular rule. In some embodiments, the policy can also include a filter and a condition. In some embodiments, presence of a condition or a filter can indicate whether to evaluate against the user space, the resource space, or combination thereof. For example, in some embodiments, if a condition is present, the condition can be evaluated against the user space. Similarly, if a filter is present, the filter can be evaluated against the resource space. In some embodiments, presence or absence of a filter or a condition is therefore indicative of whether to evaluate against the user space or the resource space. In some embodiments, the action includes any action that can be performed on a resource. In some embodiments, a policy can include an action, a resource, and a filter.

The user devices 15 can also be used to customize policies for a particular user or group of users (e.g., users within a business, or the like). In some embodiments, this can enable the user to define custom security policies.

The system 10 includes a server device 25 in electronic communication with the user devices 15 via a network 35. The server device 25 can also include an engine 40. In some embodiments, the engine 40 and the engine 20 can work together to analyze a request. In some embodiments, the engine 40 can manage security policies for various applications (e.g., order manager 70) executed by the server device 25. For example, the engine 40 can handle requests through various services for actions to aid in completing a request by the user device 15. The engine 20, in response to receiving a request, communicates with the server device 25 via the network 35 to obtain the security policies for review. The server device 25 provides the security policies to the user device 15 and the engine 20 for evaluation against the current request. As such, the engine 20 can serve as both the policy enforcement point and the policy decision point. In some embodiments, the engine 20 and the engine 40 can coordinate the review of the security policies and enforcement of the policies. In such embodiments, the engine 20 can send the user request to the server device 25 via the network 35. The engine 40 can retrieve the security policies and evaluate the current request against the security policies. The engine 40 can then send a policy decision (e.g., to deny or grant access) to the engine 20 for appropriate enforcement of the security policy on the application 60 or the web browser 65.

The server device 25 can include a policy manager 50 and a policy merger 55. The policy manager 50 can, for example, receive a custom security policy created on the user devices 15, validate the policy is complete and error free, and commit that custom policy to the policy database 45. In some embodiments, the policy manager 50 can be used to modify the default security policy. The policy merger 55 can be used to combine the default security policy and the custom security policy during runtime. In such embodiments, the policy merger 55 can provide the engine 20 of the user devices 15 with a merged security policy instead of the engine 20 completing the merging during runtime.

The server device 25 can include aspects that are the same as or similar to aspects of FIG. 4 below.

In some embodiments, the network 35 can be representative of the Internet. In some embodiments, the network 35 can include a local area network (LAN), a wide area network (WAN), a wireless network, a cellular data network, combinations thereof, or the like.

The server device 25 is in electronic communication with a database 30. The database 30 can include a plurality of policies. In some embodiments, the database 30 can include one or more databases such as the policy database 45. In some embodiments, the database 30 can be a cloud database.

The policy database 45 can store various security policies for accessing the systems made available by the server device 25. For example, the policy database 45 can store at least a default security policy. The default security policy can be a generalized security policy that is applied to all user devices 15 when accessing the systems made available by the server device 25. The policy database 45 can also include one or more custom security policies.

The one or more custom security policies can be prepared by the users of the user devices 15. The one or more custom security policies contain less rules than the default security policy. For example, when a user creates a custom security policy, they may start with the default security policy and make certain changes. When the custom security policy is stored in the policy database 45, the differences between the custom security policy and the default security policy are stored, but not the components of the custom security policy that match the default security policy. As a result, the custom security policy is not a duplicate with changes of the default security policy, and the custom security policies being stored may be smaller in size than a modified version of the default security policy. This can, for example, reduce an amount of storage space that is needed to store the various custom security policies for the numerous users of the user devices 15. When the custom security policies are needed, the custom security policy and the default security policy can be merged to result in the complete (custom) security policy.

In some embodiments, storing a default security policy and one or more custom security policies that include the differences from the default security policy can also facilitate updates to the default security policy. For example, when the default security policy is updated, the custom security policies do not each require an update as well. Thus, when there are several hundred, or even thousands of custom security policies, an amount of time to update the default security policy can be advantageously reduced. Further, by updating just the default security policy, there are fewer chances of creating an error in one of the custom security policies.

In some embodiments, the policies can be stored as a JSON object. In some embodiments, the database 30 can include a default policy and a plurality of customized policies. In such embodiments, the plurality of customized policies can store a delta or difference relative to the default policy. In some embodiments, the customized policies can be used at runtime to modify the default policy as appropriate.

An example of a security policy includes:

```
{
    "actions": ["view"],
    "resources": ["order"],
    "conditions": {
        "user": {
            "role": "ADMIN"
        }
    }
}
```

The example policy defines that: a user can "view" an "order" if the user's "role" is "ADMIN". In some embodiments, the condition includes requirements to be met for the current context. This is just one example, and can include more complex conditions that can be a variety of different rules to enforce such as, a name, a favorite color, an age, a title, combinations thereof, and the like.

In some embodiments, a filter includes a rule that can be applied to a resource if the conditions are met in a policy. A filter can optionally be included within the security policy:

```
{
  "actions": ["view"],
  "resources": ["order"],
  "conditions": {
    "user": {
      "type": "B2B"
    }
  },
  "filters": [
    {
      "filterName": "purchaserPersonalFilter",
      "filterCandidate": {
        "user": { "role": "PURCHASER"
        },
        "filterAttributes": {
          "owner": "$userId"
        }
      }
    }
  ]
}
```

The above policy defines that: a user can "view" an "order" if the user's "type" is "B2B," and, if so, then a user whose "role" is "PURCHASER" will only see orders whose owner is set to the user's "userID".

The addition of the filter enables for more complex security policies. For the filter to be applied, both the conditions and the filter must be satisfied. If either is not true, the filter will not be applied.

These security policies are examples. It is to be appreciated that the policies can include a variety of different modifications within the scope of this disclosure.

It is to be appreciated that various roles of the server device 25 and the database 30 can be distributed among the devices in the system 10. In some embodiments, the database 30 can be maintained on the server device 25.

Figure 2:
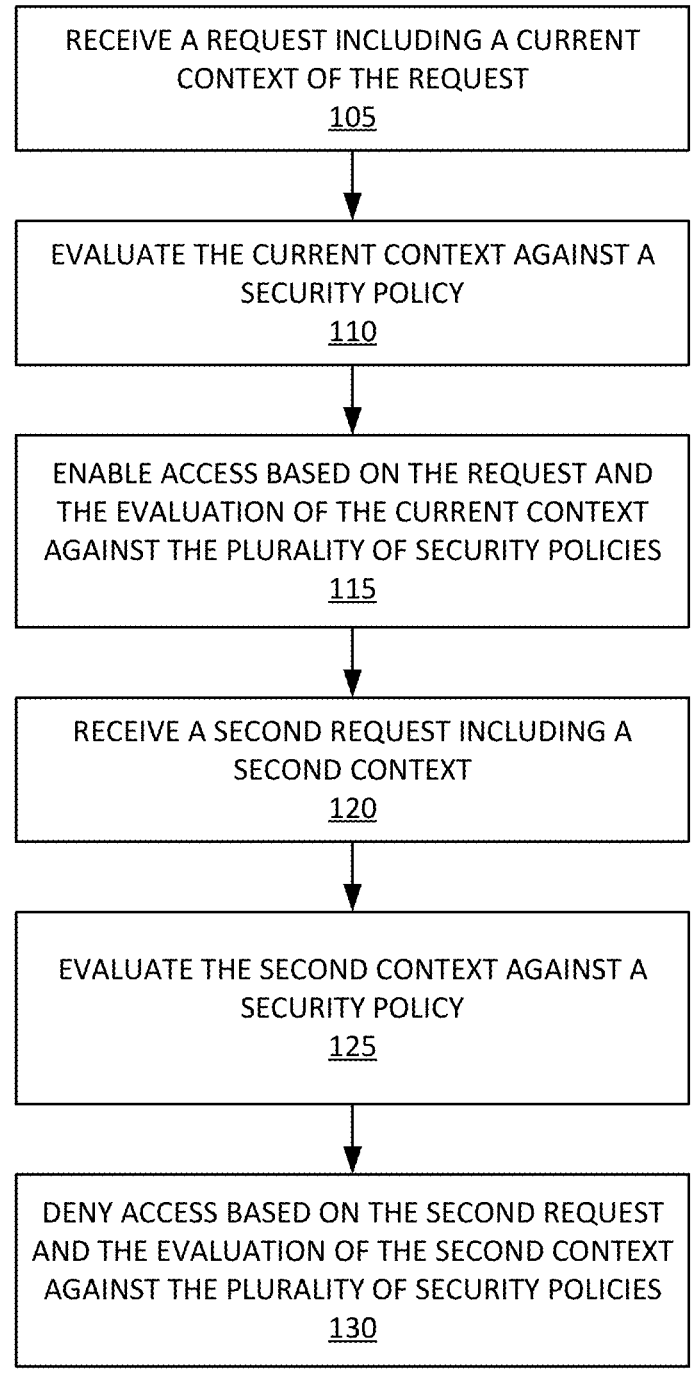
FIG. 2 is a flowchart of a method for providing controlled access to a system by a user device, according to some embodiments.

FIG. 2 is a flowchart of a method 100 for providing controlled access to a system by a user device, according to some embodiments. The method 100 can be executed by the engine 20 on the user devices 15 (FIG. 1), according to some embodiments.

At block 105, the method 100 includes receiving a user request from one of the user devices 15 to access a computer system. The engine 20 can receive the user request. In some embodiments, the request can be input to the user device 15 by a user via the application 60 (FIG. 1) or a web browser 65 (FIG. 1). The request as received includes a current context. The current context defines a user space and a resource space of the request.

At block 110, the method includes evaluating, by the engine 20, the current context as received against a security policy. In some embodiments, the security policy can be a default security policy. In some embodiments, the security policy can be a merged security policy that includes a combination of the default security policy and one or more custom security policies. The merged security policy can be received from a server device 25, according to some embodiments. In some embodiments, the default security policy and the one or more custom security policies can be received by the engine 20 and merged by the engine 20 to produce the merged security policy.

At block 115, the method 100 includes enabling access based on the request and the evaluation of the current context against the security policy. In some embodiments, enabling access based on the request and the evaluation can include permitting the user request and providing the corresponding information.

In some embodiments, at block 120 the method 100 includes receiving a second request from one of the user devices 15 to access a computer system. The engine 20 can receive the second request. In some embodiments, the second request can be input to the user device 15 by a user via the application 60 (FIG. 1) or a web browser 65 (FIG. 1). The second request as received includes a current context. The current context defines a user space and a resource space of the second request.

At block 125, the method includes evaluating, by the engine 20, the current context as received against a security policy. In some embodiments, the security policy can be a default security policy. In some embodiments, the security policy can be a merged security policy that includes a combination of the default security policy and one or more custom security policies. The merged security policy can be received from a server device 25, according to some embodiments. In some embodiments, the default security policy and the one or more custom security policies can be received by the engine 20 and merged by the engine 20 to produce the merged security policy.

At block 130, the method 100 includes denying access based on the request and the evaluation of the current context against the security policy. In some embodiments, denying access can include displaying an error message or error user interface indicating that the user request is not allowed according to the security policy.

Figure 3:
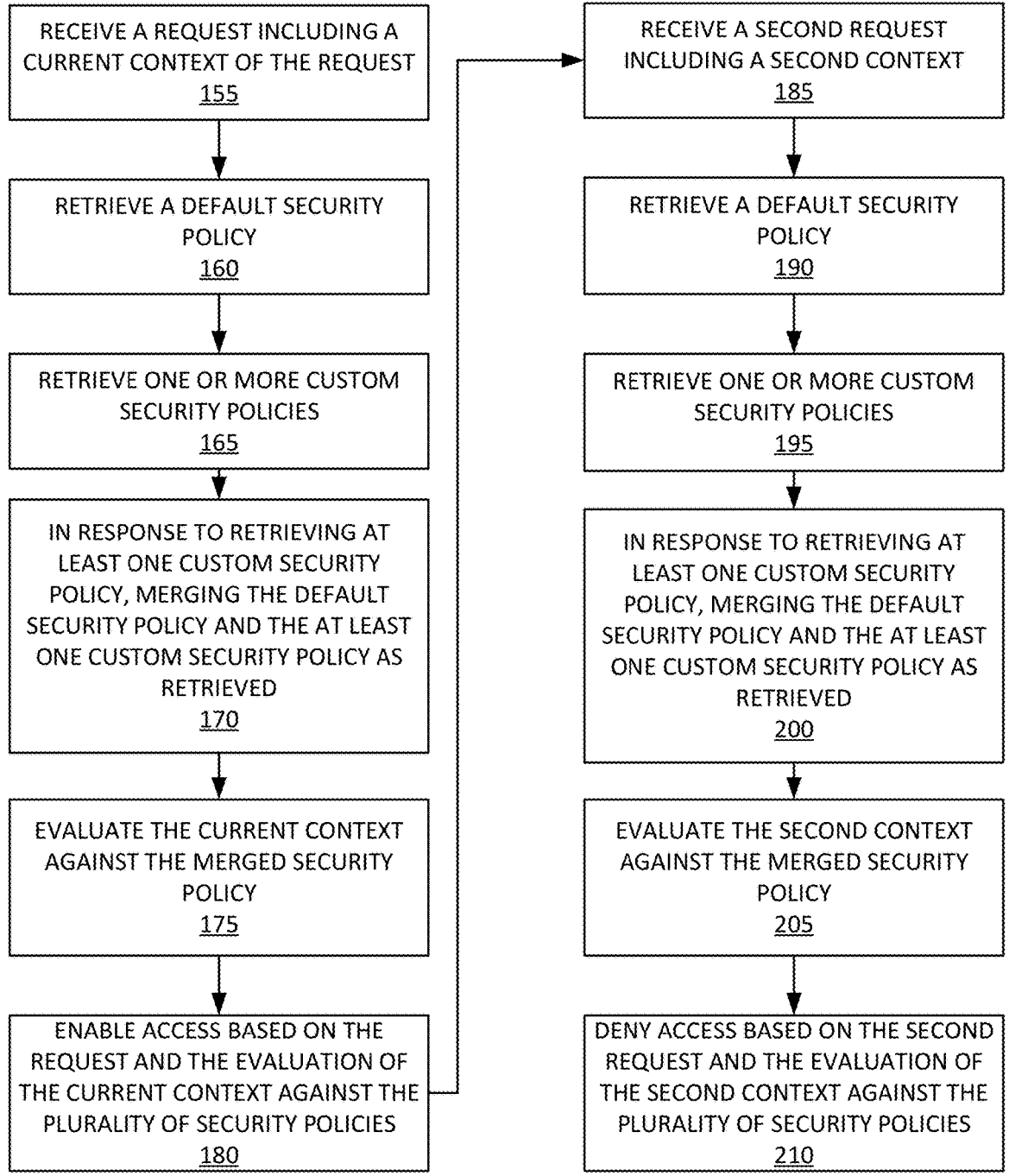
FIG. 3 is a flowchart of a method for providing controlled access to a system by a user device, according to some embodiments.

FIG. 3 is a flowchart of a method 150 for providing controlled access to a system by a user device, according to some embodiments.

At block 155, the method includes receiving, by a server device (e.g., server device 25 of FIG. 1) a user request from one of the user devices 15 to access a computer system. The request includes a current context. The current context defines a user space and a resource space of the request. The server device 25 can receive the request from, for example, an engine 20 (FIG. 1) on a user device 15 (FIG. 1).

At block 160, a policy manager (e.g., the policy manager 50 in FIG. 1) retrieves a default security policy from a database (e.g., policy database 45 in FIG. 1).

At block 165, the policy manager retrieves one or more custom security policies from the policy database. The one or more custom security policies can be associated with, for example, a business of the user making the user request.

At block 170, a policy merger (e.g., policy merger 55) merges the default security policy and the one or more custom security policies. As discussed above, the custom security policies can include variations of the default security policy. In some embodiments, the custom security policies can be a replacement to an entry in the default security policy. In some embodiments, the custom security policies can be an addition to the default security policy. In some embodiments, the custom security policy can be a deletion of an entry in the default security policy.

At block 175, the current context from the user request can be evaluated against the merged security policy to determine if the user's access request will be granted or denied.

At block 180, the method includes enabling access based on the request and the evaluation of the current context against the merged security policy. In some embodiments, enabling access based on the request and the evaluation can include permitting the user request and providing the corresponding information.

In some embodiments, at block 185, the method includes receiving, by a server device (e.g., server device 25 of FIG. 1) a second request from one of the user devices 15 to access a computer system. The second request includes a current context. The current context defines a user space and a resource space of the second request. The server device 25 can receive the second request from, for example, an engine 20 (FIG. 1) on a user device 15 (FIG. 1).

At block 190, a policy manager (e.g., the policy manager 50 in FIG. 1) retrieves a default security policy from a database (e.g., policy database 45 in FIG. 1).

At block 195, the policy manager retrieves one or more custom security policies from the policy database. The one or more custom security policies can be associated with, for example, a business of the user making the second request.

At block 200, a policy merger (e.g., policy merger 55) merges the default security policy and the one or more custom security policies. As discussed above, the custom security policies can include variations of the default security policy. In some embodiments, the custom security policies can be a replacement to an entry in the default security policy. In some embodiments, the custom security policies can be an addition to the default security policy. In some embodiments, the custom security policy can be a deletion of an entry in the default security policy.

At block 205, the current context from the second request can be evaluated against the merged security policy to determine if the second request will be granted or denied.

At block 210, based on the second request and the evaluation, the method 150 can include denying the second request and displaying an error message or error user interface indicating that the second request is not allowed according to the merged security policy.

Figure 4:
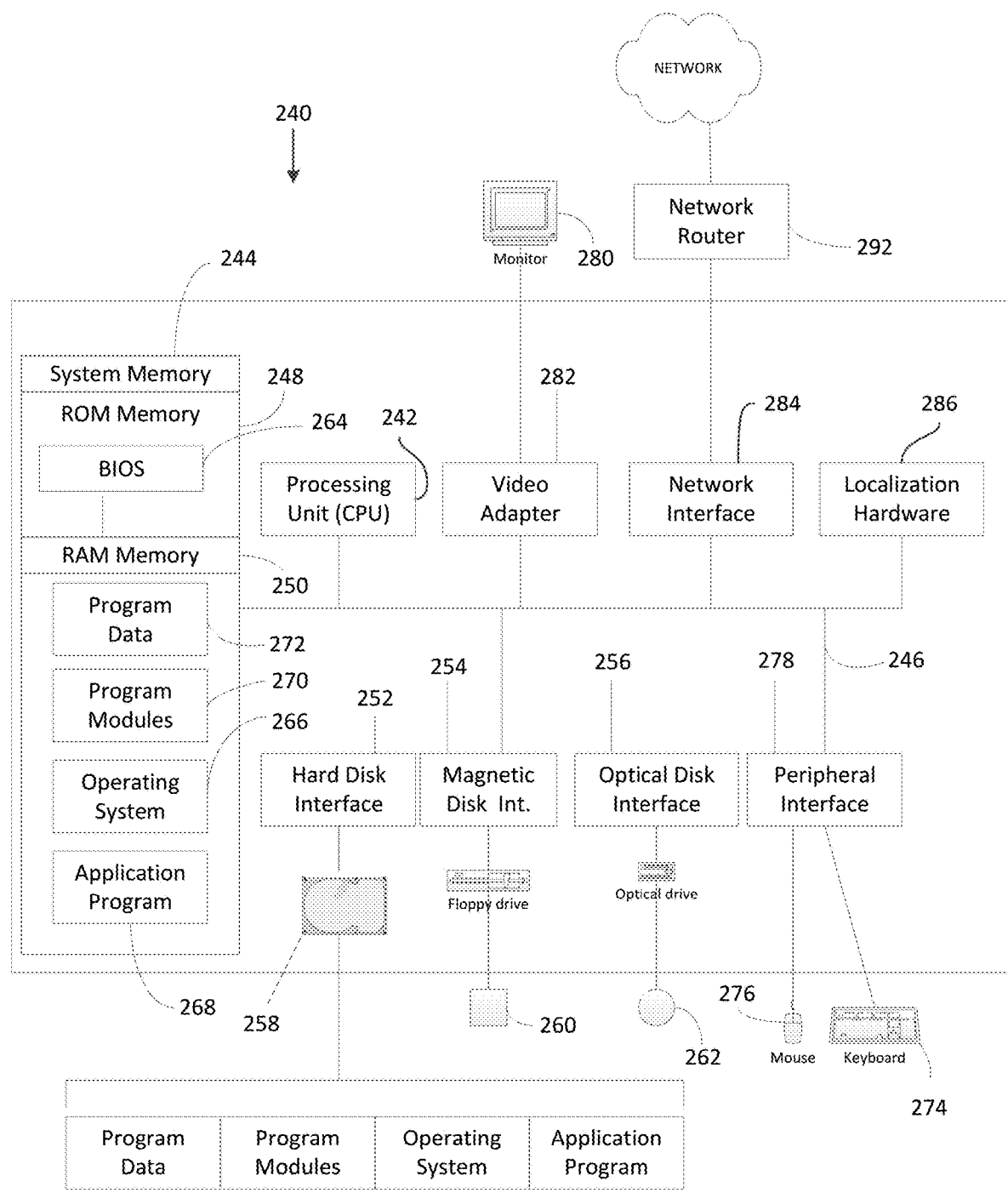
FIG. 4 is a diagrammatic view of an example user computing environment, according to some embodiments.

FIG. 4 is a diagrammatic view of an illustrative computing system that includes a general-purpose computing system environment 240, such as a desktop computer, laptop, smartphone, tablet, or any other such device having the ability to execute instructions, such as those stored within a non-transient, computer-readable medium. Furthermore, while described and illustrated in the context of a single computing system 240, those skilled in the art will also appreciate that the various tasks described hereinafter may be practiced in a distributed environment having multiple computing systems 240 linked via a local or wide-area network in which the executable instructions may be associated with and/or executed by one or more of multiple computing systems 240.

In its most basic configuration, computing system environment 240 typically includes at least one processing unit 242 and at least one memory 244, which may be linked via a bus 246. Depending on the exact configuration and type of computing system environment, memory 244 may be volatile (such as RAM 250), non-volatile (such as ROM 248, flash memory, etc.) or some combination of the two. Computing system environment 240 may have additional features and/or functionality. For example, computing system environment 240 may also include additional storage (removable and/or non-removable) including, but not limited to, magnetic or optical disks, tape drives and/or flash drives. Such additional memory devices may be made accessible to the computing system environment 240 by means of, for example, a hard disk drive interface 252, a magnetic disk drive interface 254, and/or an optical disk drive interface 256. As will be understood, these devices, which would be linked to the system bus 246, respectively, allow for reading from and writing to a hard disk 258, reading from or writing to a removable magnetic disk 260, and/or for reading from or writing to a removable optical disk 262, such as a CD/DVD ROM or other optical media. The drive interfaces and their associated computer-readable media allow for the nonvolatile storage of computer readable instructions, data structures, program modules and other data for the computing system environment 240. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 240.

Several program modules may be stored in one or more of the memory/media devices. For example, a basic input/output system (BIOS) 264, containing the basic routines that help to transfer information between elements within the computing system environment 240, such as during start-up, may be stored in ROM 248. Similarly, RAM 230, hard drive 258, and/or peripheral memory devices may be used to store computer executable instructions comprising an operating system 266, one or more applications programs 268 (such as the search engine or search result ranking system disclosed herein), other program modules 270, and/or program data 272. Still further, computer-executable instructions may be downloaded to the computing environment 260 as needed, for example, via a network connection.

An end-user may enter commands and information into the computing system environment 240 through input devices such as a keyboard 274 and/or a pointing device 276. While not illustrated, other input devices may include a microphone, a joystick, a game pad, a scanner, etc. These and other input devices would typically be connected to the processing unit 242 by means of a peripheral interface 278 which, in turn, would be coupled to bus 246. Input devices may be directly or indirectly connected to processor 242 via interfaces such as, for example, a parallel port, game port, firewire, or a universal serial bus (USB). To view information from the computing system environment 240, a monitor 280 or other type of display device may also be connected to bus 246 via an interface, such as via video adapter 282. In addition to the monitor 280, the computing system environment 240 may also include other peripheral output devices, not shown, such as speakers and printers.

The computing system environment 240 may also utilize logical connections to one or more computing system environments. Communications between the computing system environment 240 and the remote computing system environment may be exchanged via a further processing device, such a network router 292, that is responsible for network routing. Communications with the network router 292 may be performed via a network interface component 284. Thus, within such a networked environment, e.g., the Internet, World Wide Web, LAN, or other like type of wired or wireless network, it will be appreciated that program modules depicted relative to the computing system environment 240, or portions thereof, may be stored in the memory storage device(s) of the computing system environment 240.

The computing system environment 240 may also include localization hardware 286 for determining a location of the computing system environment 240. In embodiments, the localization hardware 286 may include, for example only, a GPS antenna, an RFID chip or reader, a Wi-Fi antenna, or other computing hardware that may be used to capture or transmit signals that may be used to determine the location of the computing system environment 240.

The computing environment 240, or portions thereof, may include one or more of the user device 15 and the server device 25 of FIG. 1, in embodiments.

The systems and methods described herein can advantageously ensure that B2B interactions include flexible and easy to manage security policies that are customizable by the businesses and the users accessing the computer systems of another business (e.g., a retail seller).

Examples of computer-readable storage media include, but are not limited to, any tangible medium capable of storing a computer program for use by a programmable processing device to perform functions described herein by operating on input data and generating an output. A computer program is a set of instructions that can be used, directly or indirectly, in a computer system to perform a certain function or determine a certain result. Examples of computer-readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing.

In some embodiments, hardwired circuitry may be used in combination with software instructions. Thus, the description is not limited to any specific combination of hardware circuitry and software instructions, nor to any source for the instructions executed by the data processing system.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A computer-implemented method for providing controlled access to a system by a user device, the method comprising:
   receiving a request for access to a computing resource, the request including a current context, the current context defining a user space and a resource space;
   evaluating, by the user device, the current context against a security policy,
      wherein the security policy comprises a default security policy and one or more custom security policies;
      wherein the one or more custom security policies include fewer rules than the default security policy including differences from the default security policy; and
      wherein the evaluating includes merging, by the user device, the default security policy and the one or more custom security policies;
   determining that the user device is permitted to access the computing resource based on the request in response to the evaluating the current context against the security policy; and
   in response to determining that the user device is permitted to access the computing resource, accessing the computing resource as requested.

2. The computer-implemented method of claim 1, wherein the determining that the user device is permitted to access the computing device based on the request in response to the evaluating the current context against the security policy is performed by the user device.

3. The computer-implemented method of claim 1, wherein the request is a first request, the method further comprising:
   receiving, from the user device, a second request for access to a second computing resource, the second request including a second context, the second context defining a user space and a resource space;
   evaluating, by the user device, the second context against a security policy;
   determining that the user device is not permitted to access the second computing resource based on the second request in response to the evaluating the second context against the security policy; and
   in response to determining that the user device is not permitted to access the second computing resource, displaying an error message on the user device.

4. The computer-implemented method of claim 1, wherein the user space and the resource space are respective of the user device.

5. The computer-implemented method of claim 1, wherein the security policy is received by the user device from a policy database.

6. A computer-implemented method for providing controlled access to a system by a user device, comprising:
   receiving, by a server device, a request to access a computing resource made available by the server device and including a current context, the current context defining a user space and a resource space;
   in response to receiving the request, retrieving a default security policy from a database and a custom security policy from the database,
      wherein the custom security policy includes fewer rules than the default security policy including differences from the default security policy;
   merging the default security policy as retrieved and the custom security policy as retrieved into a merged security policy;
   evaluating, by the server device, the current context against the merged security policy;
   determining that the request is permissible based on the evaluating the current context against the merged security policy; and
   enabling access to the computing resource.

7. The computer-implemented method of claim 6, wherein the merging comprises one or more of removing an entry from the default security policy, adding an entry to the default security policy, or updating an entry in the default security policy.

8. The computer-implemented method of claim 6, wherein the retrieving a default security policy from a database, the retrieving a custom security policy from the database, and the merging the default security policy as retrieved, and the custom security policy as retrieved into a merged security policy are completed by the server device in communication with the database.

9. The computer-implemented method of claim 6, wherein the request is a first request, further comprising:
receiving, by the server device, a second request to access a second computing resource made available by the server device and including a second context, the second context defining a user space and a resource space;
in response to receiving the second request, retrieving the default security policy from the database and the custom security policy from the database;
merging the default security policy as retrieved and the custom security policy as retrieved into the merged security policy;
evaluating, by the server device, the second context against the merged security policy;
determining that the second request is not permissible based on the evaluating the second context against the merged security policy; and
disabling access to the second computing resource in response to determining that the second request is not permissible.

10. A computer-implemented method, comprising:
receiving a request for access to a computing resource, the request including a current context, the current context defining a user space and a resource space;
evaluating the current context against a security policy,
  wherein the security policy comprises a default security policy and one or more custom security policies;
  wherein the one or more custom security policies include fewer rules than the default security policy including differences from the default security policy; and
  wherein the evaluating includes merging the default security policy and the one or more custom security policies to create a merged security policy;
determining that a user device that is a source of the request is permitted to access the computing resource based on the evaluating the current context against the security policy; and
accessing the computing resource as requested.

11. The computer-implemented method of claim 10, wherein the evaluating the current context against a security policy is performed by a user device.

12. The computer-implemented method of claim 10, wherein the evaluating the current context against a security policy is performed by a server device.

13. The computer-implemented method of claim 10, further comprising:
evaluating a second context against a security policy;
determining that the user device is not permitted to access the computing resource based on the evaluating the second context against the security policy; and
denying access to the computer resource as requested.

14. The computer-implemented method of claim 10, wherein the merged security policy comprises one or more of an entry removed from the default security policy, an entry added to the default security policy, or an entry updated in the default security policy.

15. The computer-implemented method of claim 10, wherein the current context comprises a user space or a resource space.

16. The computer-implemented method of claim 10, further comprising receiving a request to access a computing resource.

17. The computer-implemented method of claim 16, wherein the request to access the computing resource is received by the user device.

* * * * *